United States Patent [19]

Noguchi

[11] Patent Number: 5,099,180
[45] Date of Patent: Mar. 24, 1992

[54] ULTRASONIC MOTOR DRIVING CIRCUIT
[75] Inventor: Masahiro Noguchi, Tokyo, Japan
[73] Assignee: Seiko Instruments Inc., Japan
[21] Appl. No.: 625,858
[22] Filed: Dec. 11, 1990
[51] Int. Cl.⁵ .............................................. H01L 41/08
[52] U.S. Cl. ................................... 318/116; 310/316
[58] Field of Search .............. 310/316, 317, 323, 328; 318/116, 118

[56] References Cited
U.S. PATENT DOCUMENTS

| | | | |
|---|---|---|---|
| 4,727,276 | 2/1988 | Izukawa et al. | 310/316 |
| 4,743,788 | 5/1988 | Takagi et al. | 310/316 |
| 4,965,481 | 10/1990 | Kashiyama | 310/316 |

Primary Examiner—Mark O. Budd
Attorney, Agent, or Firm—Bruce L. Adams; Van C. Wilks

[57] ABSTRACT

An ultrasonic motor driving circuit has a drive duty generating circuit that intermittently outputs a drive request signal according to the battery voltage, and a drive signal output means that receives the drive request signal to output a drive signal. The drive signal is in the form of bursts with pause intervals, the pause intervals being variable with a change in the battery voltage thereby improving utilization of the battery capacity.

2 Claims, 5 Drawing Sheets

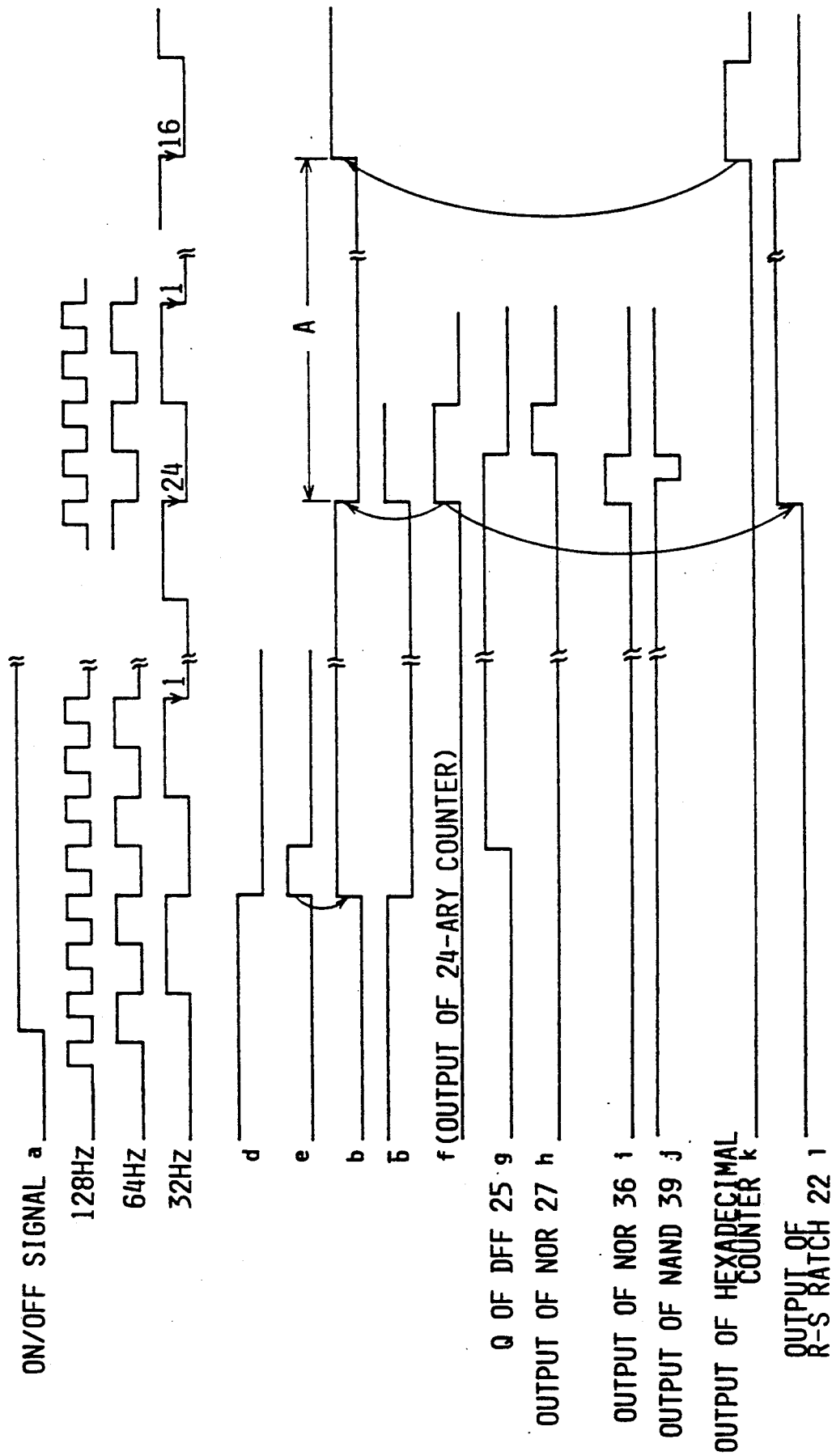

ULTRASONIC MOTOR DRIVING CIRCUIT

BACKGROUND OF THE INVENTION

The present invention relates to an ultrasonic motor driving circuit which employs a piezo-electric element to generate a driving force for the ultrasonic motor.

The conventional type ultrasonic motor has been driven continuously by supplying a large current of several tens of milliamperes continuously from a battery.

In this type motor, therefore, the battery capacity cannot be utilized effectively.

In general, when a large current is to be derived from a battery, the quantity of current that can be used is less than the capacity of the battery. This may be explained by referring to FIG. 2, which shows load characteristics of a battery. In the figure, curves A, B, C represent load characteristics for three different load resistances (small, medium and large), respectively. When, for example, the final voltage is taken as 2.0 V, the current utilization of each load resistor is some 5418 mAh for the curve A, some 5486 mAh for the curve B and about 5645 mAh for the curve C. This shows that the smaller the current taken out, the more effectively the battery capacity can be utilized.

The conventional drive method that continuously uses a large amount of current, therefore, has the drawback of not being able to make full use of the battery capacity.

SUMMARY OF THE INVENTION

The object of the present invention is to provide an ultrasonic motor driving circuit which improves utilization of the battery capacity.

To eliminate the above problem, an ultrasonic motor driving circuit according to this invention comprises: a control circuit; a battery voltage detecting circuit to detect a battery voltage; a drive duty generating circuit to output a drive request signal intermittently according to signals output from the control circuit and the battery voltage detecting circuit; a drive signal output means to receive the drive request signal and output a corresponding drive signal; a phase shifting circuit to which the drive signal is supplied; and a driver to which an output from the phase shifting circuit is supplied.

With the above configuration, the battery voltage is detected by the battery voltage detecting circuit which is activated according to the control signal. The drive duty generating circuit determines a pause period of the drive request signal based on the detected voltage and outputs a drive request signal intermittently. Upon receiving the drive request signal, the drive signal output means produces a drive signal intermittently. The drive signal thus generated is entered into the phase shifting circuit where it is phase-shifted by 90° and then output. The driver supplies current to the ultrasonic motor according to the output from the phase shifting circuit. The output signal of the driver, therefore, is in the form of bursts with pause intervals, the pause intervals being variable with a change in the battery voltage.

BRIEF DESCRIPTION OF THE DRAWINGS

FIG. 5 is a waveform diagram.

DETAILED DESCRIPTION OF THE PREFERRED EMBODIMENT

Figure 1:
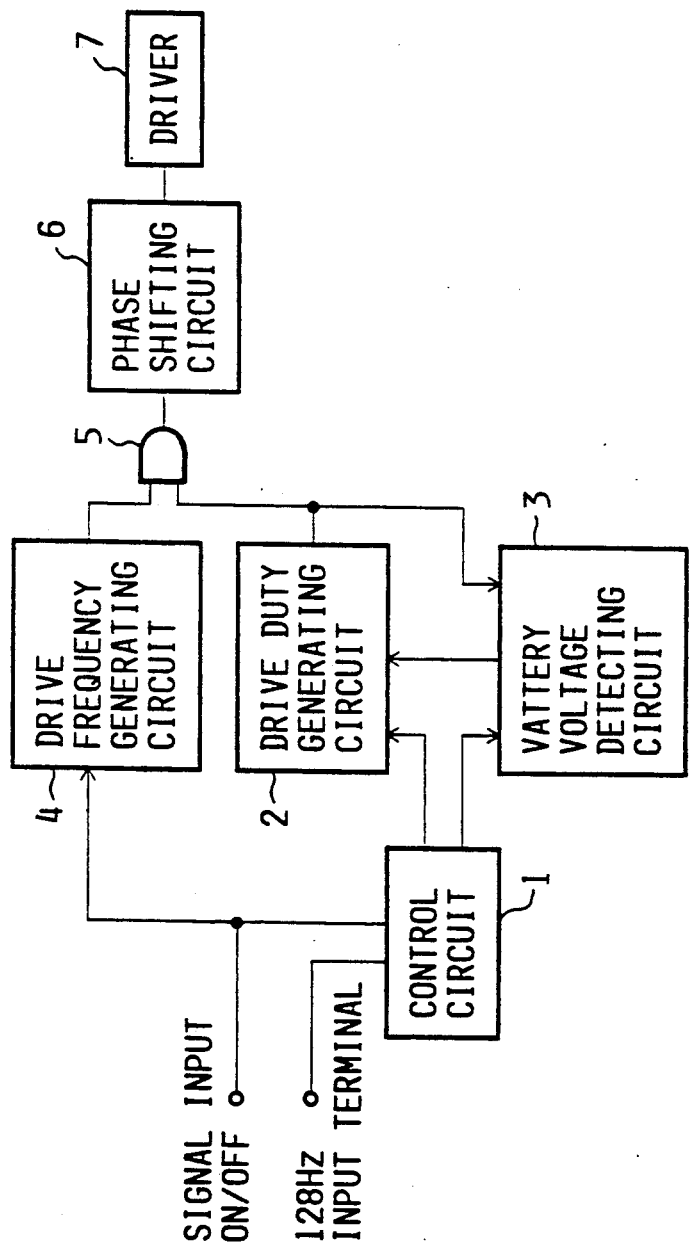
FIG. 1 is a block diagram showing as one embodiment of this invention the configuration of an ultrasonic motor driving circuit.
Figure 2:
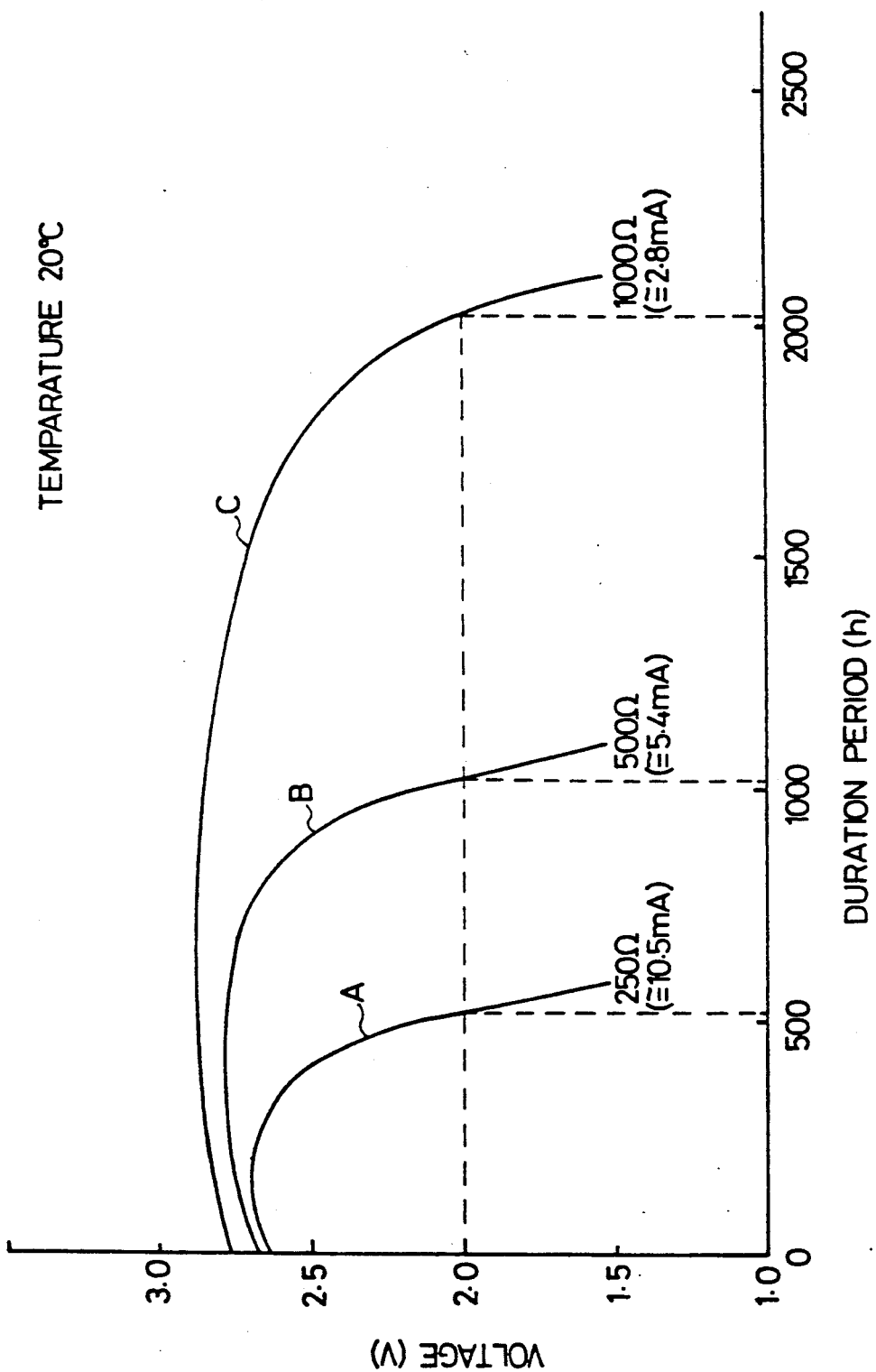
FIG. 2 is a load characteristic diagram of a battery.

FIG. 1 is a block diagram showing the configuration of an embodiment of this invention. A control circuit 1 receives an ON/OFF signal and a frequency signal from outside, and controls the ultrasonic motor operation. A drive duty generating circuit 2 generates a drive request signal according to a drive enable signal from the control circuit 1 and to battery voltage information from a battery voltage detecting circuit 3, and sends the drive request signal to an AND gate 5 and the battery voltage detecting circuit 3. The battery voltage detecting circuit 3 measures the battery voltage at the high-to-low transition of the drive request signal output from the drive duty generating circuit 2 and sends the measured voltage to the drive duty generating circuit 2. One cycle of the drive request signal output from the drive duty generating circuit 2 consists of a high-level pulse of a constant duration and low-level pulse whose duration changes according to the voltage detection result from the battery voltage detecting circuit 3.

The drive request signal is produced continuously while the drive enable signal from the control circuit 1 is present. The AND gate 5 applies a drive frequency signal output from a drive frequency generating circuit 4 to a phase shifting circuit 6 while the drive request signal from the drive duty generating circuit 2 is high. When the drive frequency signal of the AND gate 5 containing a pause period is high, the phase shifting circuit 6 shifts the frequency signal by 90°. A driver 7, according to the frequency signal from the phase shifting circuit 6, supplies current to the ultrasonic motor to drive it intermittently.

The battery voltage detecting circuit 3, using the frequency signal from the control circuit 1, measures the battery voltage at the trailing edge of the drive request signal of the drive duty generating circuit 2, and sends the measured voltage information to the drive duty generating circuit 2. The drive duty generating circuit 2 produces a drive request signal, which consists of a high-level pulse of constant duration and a low-level pulse of variable duration that changes depending on the battery voltage information received, that is, the low-level pulse lasts a short duration when the battery capacity is sufficient and a long duration when it is small. This variable signal allows effective use of the battery capacity. While in this embodiment the duty ratio of the drive request signal produced by the drive duty generating circuit is made variable according to the battery voltage, it is also possible to make it constant in duration.

Further description of this embodiment will be given with reference to FIGS. 3–5.

Figure 3:
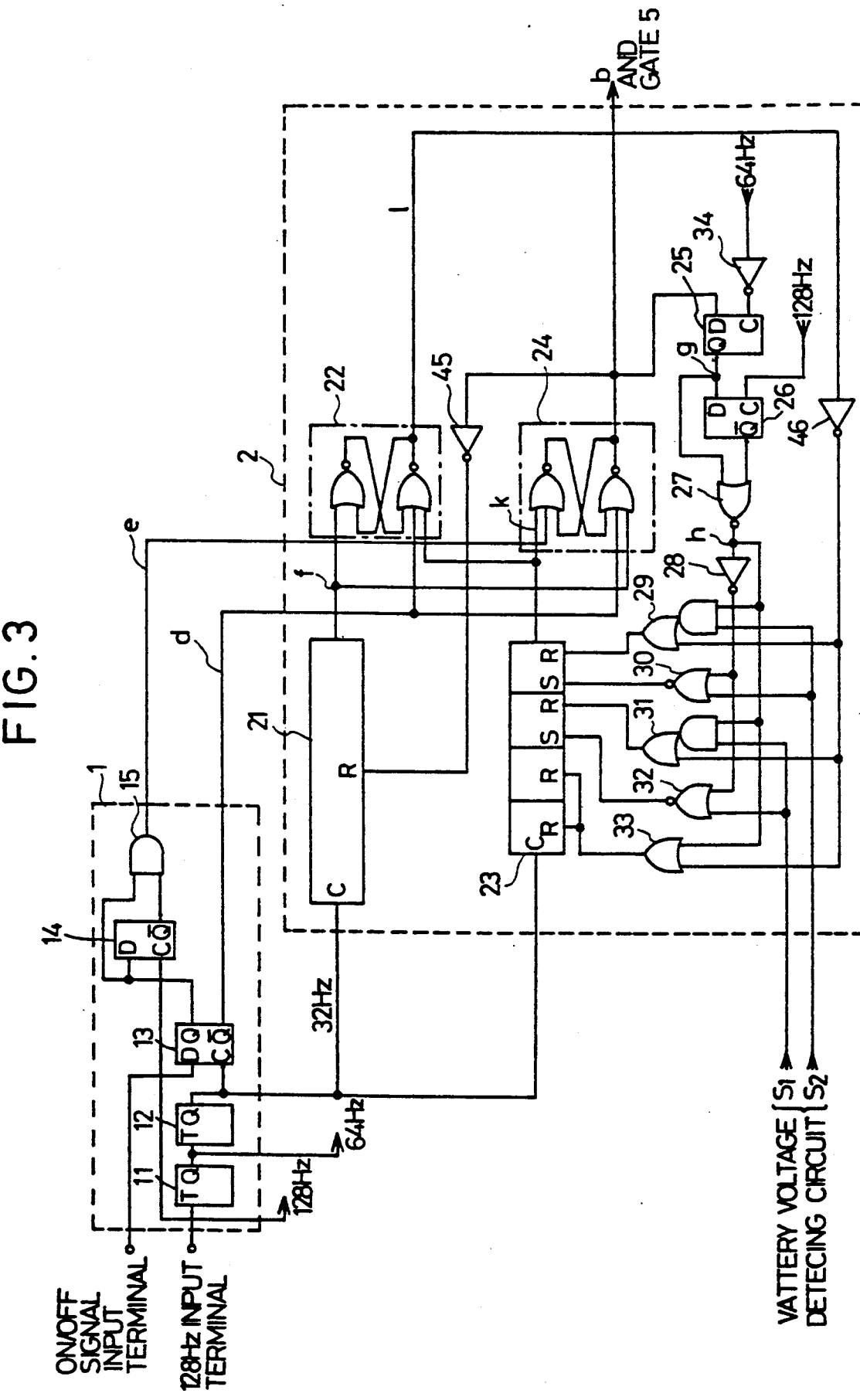
FIG. 3 is a detailed circuit diagram for the control circuit and drive generating circuit.

FIG. 3 is a detailed circuit diagram for the control circuit 1 and the drive duty generating circuit 2 of this embodiment. Now, referring to a timechart of FIG. 5, an explanation will be given of the connections and operation of FIG. 3.

The control circuit 1 receives at its inputs an ON/OFF signal and a frequency signal from outside to control the operation of the ultrasonic motor.

The external 128 Hz frequency signal is divided by a first T flip-flop 11 to one-half (64 Hz) and further halved by a second T flip-flop 12 to 32 Hz, which is then supplied to a first D flip-flop 13. The first D flip-flop 13 receives an external ON/OFF signal which when on, that is, the signal a goes high, the first D flip-flop 13 uses the 32 Hz frequency signal and holds its Q output high, which is entered into differentiating circuit 14, 15. The differentiating circuit 14, 15 receives the 128 Hz signal and produces, at the rising edge of the Q output of the first D flip-flop 13, a one-shot pulse signal e of a duration corresponding to one cycle of the 128 Hz frequency signal.

The drive duty generating circuit 2 produces a drive request signal according to a drive enable signal from the control circuit 1 and to battery voltage information from the battery voltage detecting circuit 3. One cycle of the drive request signal output from the drive duty generating circuit 2 consists of a constant-duration high-level pulse and a variable-duration low-level pulse that follows the high-level pulse and whose duration changes according to the output of the battery voltage detecting circuit 3. The drive request signal is produced continuously while there is the drive enable signal from the control circuit 1.

The 32 Hz frequency signal from the control circuit 1 is a applied to a 24-ary counter 21 that sets the output duration of the drive duty generating circuit 2 and to a hexadecimal presettable counter 23 that sets the pause duration of the circuit 2. When the $\overline{Q}$output signal d from the first D flip-flop 13 is high, a first R-S latch 22 and second R-S latch 24 are reset. The output of the 24-ary counter 21 is connected to the input of the first R-S latch 22 and to the reset of the second R-S latch 24; and the output of the hexadecimal presettable counter 23 is connected to the reset of the first R-S latch 22 and to the input of the second R-S latch 24.

The output signal e from the differentiating circuit 14, 15 of the control circuit 1 is fed to the second R-S latch 24, which, when the signal d at its reset terminal applied from the control circuit 1 becomes low, produces a signal b that goes high at the positive-going edge of the one-shot pulse of signal e from the control circuit 1. This initiates the output period, driving the ultrasonic motor.

The output signal b of the second R-S latch 24 is inverted by an inverter 45 to become $\overline{b}$, which is connected to the reset terminal of the 24-ary counter 21. The 24-ary counter 21 starts counting at the negative-going edge of the signal $\overline{b}$. Upon finishing the counting, the 24-ary counter 21 produces a one-shot pulse signal f, which is supplied to the first R-S latch 22 and the second R-S latch 24. The output signal b of the second R-S latch 24 undergoes high-to-low transition at the rising edge of the output signal f of the 24-ary counter 21. At the same time the 24-ary counter 21 is reset by the signal $\overline{b}$. This terminates the output period stopping the drive signal to the ultrasonic motor, now starting the pause period. An output signal l of the first R-S latch 22 goes high at the rising edge of the output signal f of the 24-ary counter 21.

A D flip-flop 25 receives the signal b from the second R-S latch 24 and uses the 64 Hz frequency signal from the control circuit 1, which is inverted by the inverter 34, to produce a signal g that lags the input signal b by a half cycle of the 64 Hz frequency signal. This output signal g is entered into a shaping circuit 26, 27 which, by using the 128 Hz frequency signal from the control circuit 1 outputs a one-shot pulse h at the lowering edge of the signal g. The one-shot pulse h from the shaping circuit 26, 27 is connected through a series of gates 29, 31, 33 to the reset terminals of the hexadecimal presettable counter 23. The pulse h is also inverted by an inverter 28 and fed through gates 30, 32 to the set terminals of the hexadecimal presettable counter 23, which is set according to battery voltage information at the rising edge of the signal h.

The output signal l from the first R-S latch 22 is inverted by an inverter 46 and is fed through gates 29, 31, 33 to the reset terminals of the hexadecimal presettable counter 23.

Outputs S1, S2 of the battery voltage detecting circuit 3 are applied through gates 31, 32, 29, 30 to the hexadecimal presettable counter 23. When for example the battery voltage is sufficiently high, the outputs S1, S2 of the battery voltage detecting circuit 3 are both low. When the battery voltage is between 2.4 V and 2.8 V, the output S1 is high and S2 low. When the battery voltage is below 2.4 V, the outputs S1, S2 are both high.

Now, let us take the example of the battery voltage being less than 2.4 V. The outputs S1, S2 of the battery voltage detecting circuit 3 are both high; the hexadecimal presettable counter 23 thus becomes 0000 and counts the 32 Hz frequency signal from the control circuit 1 for the period of sixteen cycles (0.5 seconds), before producing a one-shot pulse K at the lowering edge of the 32 Hz frequency signal. At the rising edge of this one-shot pulse K, the first R-S latch 22 is reset and the second R-S latch 24 undergoes low-to-high transition, terminating the pause period of the ultrasonic motor and starting the output period again. Hence the ultrasonic motor is restarted.

With the above operation repeated, the ultrasonic motor can be operated in such a way that the pause period corresponds to the battery capacity.

Figure 4:
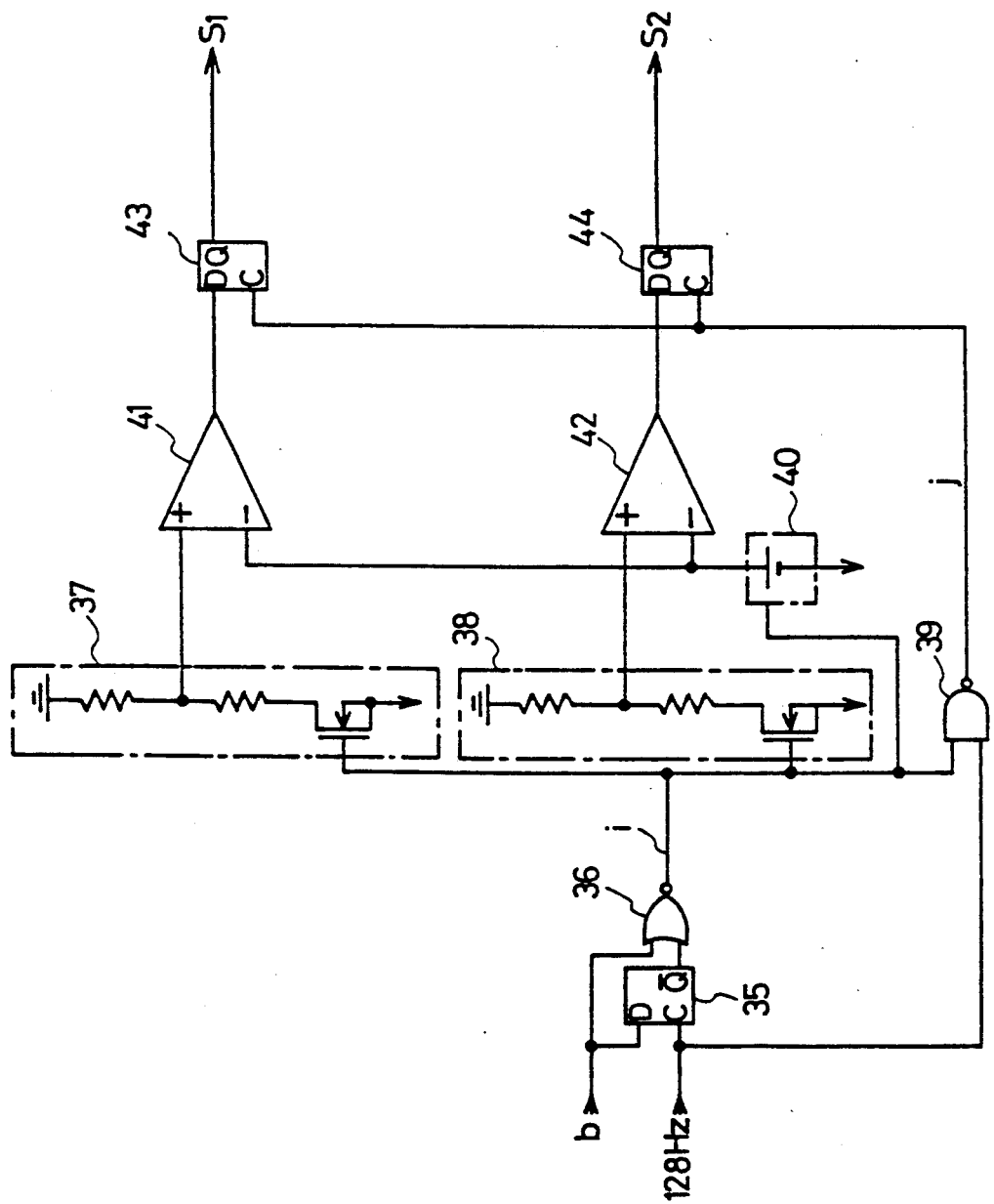
FIG. 4 is a detailed circuit diagram of the battery voltage detecting circuit.

Next, by referring to the detailed circuit diagram of FIG. 4 showing the battery voltage detecting circuit 3 and to the timechart of FIG. 5, we will describe their connections and operations.

The battery voltage detecting circuit 3, using the frequency signal from the control circuit 1, detects the battery voltage at the lowering edge of the drive request signal b output from the drive duty generating circuit 2 and sends the voltage information to the drive duty generating circuit 2.

A shaping circuit 35, 36 in the battery voltage detecting circuit 3 receives the signal b output from the drive duty generating circuit 2 and, by using the 128 Hz frequency signal from the control circuit 1, produces at the lowering edge of the signal b a one-shot pulse i for battery voltage sampling. The output of the shaping circuit 35, 36 is connected to first and second voltage dividing circuits 37, 38 that each divide the battery voltage by resistance division and also to a constant reference voltage source 40, a stable regulated voltage source that utilizes the threshold voltage of MOS transistor and has immunity to power supply variations. A first comparator 41 compares the voltage of the first voltage dividing circuit 37 with the reference voltage source 40 to detect the battery voltage of, for example, −2.8 V. The first comparator 41 produces a low output when the battery voltage is sufficiently high and, when it is below 2.8 V, generates a high output. Likewise, the second comparator 42 compares the voltage of the second voltage dividing circuit 38 with the reference voltage source 40 to detect the battery voltage of, say, −2.4

V. The output of the second comparator 42 becomes low when the battery voltage is high enough and goes high when it is below 2.4 V.

A NAND gate 39 receives as inputs the 128 Hz frequency signal from the control circuit 1 and the output signal i from the shaping circuit 35, 36. The output of the NAND gate 39 is connected to C inputs of D flip-flops 43, 44. The outputs of the first and second comparators 41, 42 are supplied to D inputs of the D flip-flops 43, 44. Using the output of the NAND gate 39, the D flip-flops 43, 44 latch the output data from the first and second comparators 41, 42, respectively. The outputs S1, S2 of the D flip-flops 43, 44 represent the battery voltage information output from the battery voltage detecting circuit 3 to the drive duty generating circuit 2.

Because of the above configuration the present invention has an advantage of being able to improve utilization of the battery capacity. Furthermore, since the pause period of the burst signal, which is used to drive the ultrasonic motor, is made to change according to the battery voltage level, the utilization can further be improved over the apparatus in which the pause period is fixed.

This advantage becomes pronounced especially when the ultrasonic motor is used as the driving source of vibrating alarm because when the battery voltage is high enough, the above configuration allows continuous operation of the motor.

What is claimed is:

1. An ultrasonic motor driving circuit comprising:
   a control circuit which receive a frequency signal and an external ON/OFF signal, and outputs a drive enable signal and a frequency signal;
   a battery voltage detecting circuit to detect a battery voltage;
   a drive duty generating circuit to output a drive request signal intermittently according to signals output from the control circuit and the battery voltage detecting circuit;
   a drive signal output means for receiving the drive request signal and outputting a corresponding drive signal;
   a phase shifting circuit to which the drive signal is supplied; and
   a driver to which an output from the phase shifting circuit is applied.

2. An ultrasonic motor driving circuit as claimed in claim 1 wherein said drive duty generating circuit has a constant duty ratio of the drive request signal.

* * * * *